Dec. 20, 1966  J. T. KUTNEY  3,292,880
THRUST DEFLECTING MECHANISM
Filed Sept. 1, 1964  2 Sheets-Sheet 1
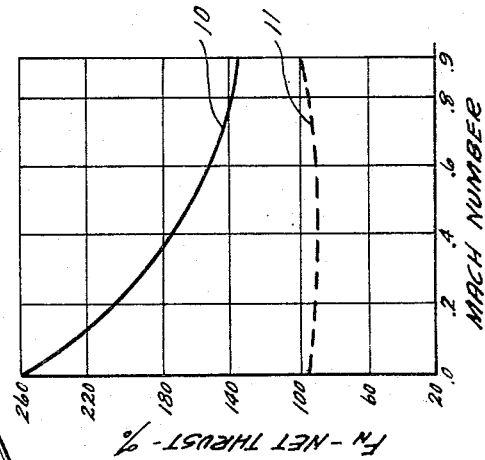
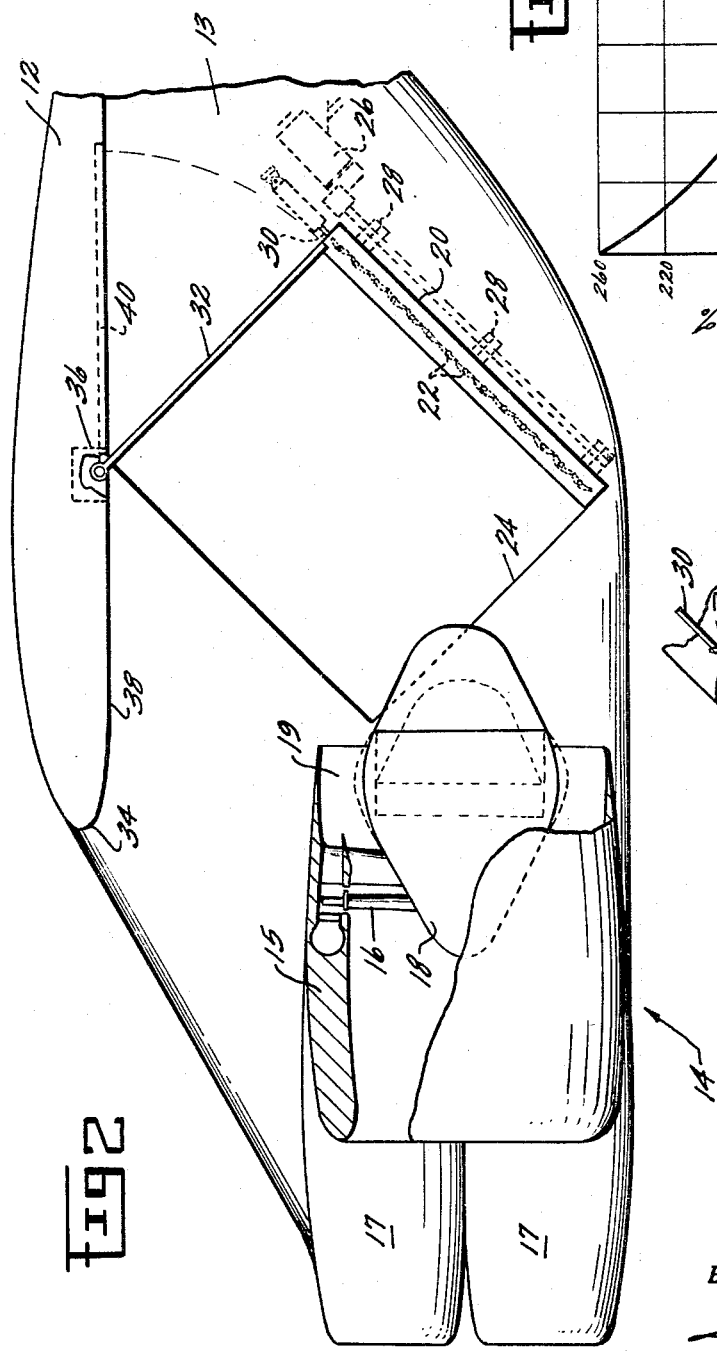
INVENTOR.
JOHN T. KUTNEY
BY
ATTORNEY Dec. 20, 1966  J. T. KUTNEY  3,292,880
THRUST DEFLECTING MECHANISM
Filed Sept. 1, 1964  2 Sheets-Sheet 2
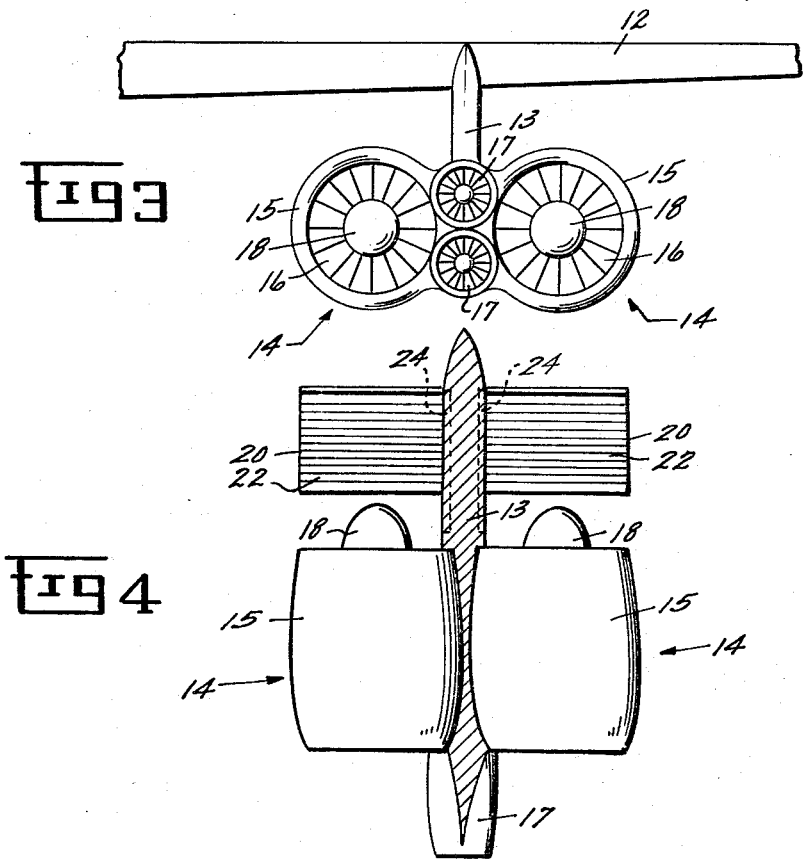
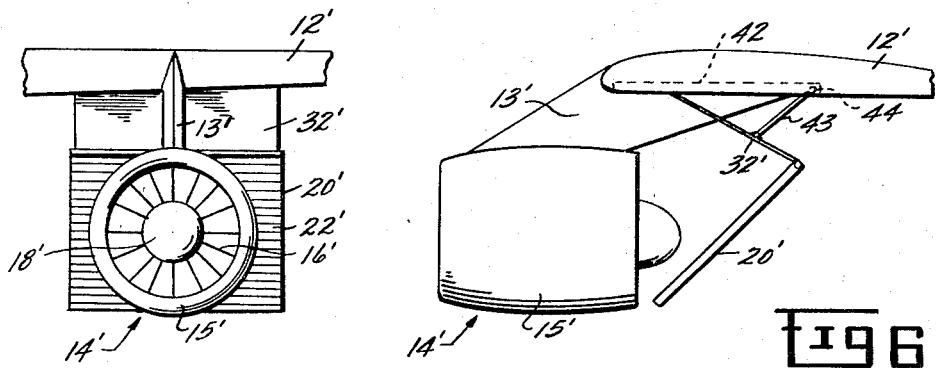
INVENTOR.
JOHN T. KUTNEY
BY
ATTORNEY- United States Patent Office 3,292,880
Patented Dec. 20, 1966

1

3,292,880
THRUST DEFLECTING MECHANISM
John T. Kutney, Cincinnati, Ohio, assignor to General Electric Company, a corporation of New York
Filed Sept. 1, 1964, Ser. No. 393,621
12 Claims. (Cl. 244—12)

The present invention relates to thrust deflecting mechanism and, more particularly, to thrust deflecting mechanism that may be used for both deflecting and reversing and is especially adaptable to high by-pass ratio turbofan powerplants.

One of the main reasons why the high by-pass turbofan system, having by-pass ratios of 4 to 1 and above, is so attractive for V/STOL aircraft operation is that it has very high static thrust and excellent specific fuel consumption—SFC—approaching that of a turboprop powerplant. Additionally, such a powerplant has a very good thrust lapse rate meaning that at zero speed it has an extremely high thrust as compared to a turbojet and this drops off favorably to match aircraft drag requirements at Mach=.8. Consequently, an aircraft so equipped has a large lift for VTOL or STOL operation and also has matched thrust at cruise conditions when the aircraft has low drag. The problem with some of the very high by-pass ratio turbofans, such as the tip turbine, is that the frontal area as compared to the turbojet, gets very large making the installation problems more severe.

In the lift cruise fan type of turbofan engine it is desired to get VTOL capability from the engine and it has been proposed that the cruise fan be rotated as one means of accomplishing this. However, there are installations such as wing mounted systems, where it is impractical to rotate the nacelle as might be done on fuselage mounted installations. The advantage of the cruise fan is, as stated above, excellent static thrust characteristics or very high thrust at the start of the aircraft mission.

A very flexible powerplant is one which is capable of efficient V/STOL operation as well as conventional operation for those applications where long runways are available. In such conventional applications, it is possible to carry more load at takeoff conditions. Thrust reversal is desired for conventional aircraft operation to bring the aircraft to a halt at landing. Under purely VTOL operation thrust reversal is normally not required.

Furthermore, in turbofans of high by-pass ratio it is necessary to provide a variable area exhaust nozzle and this may be done with the conventional finger nozzle or with a center plug that may have one or more positions for varying the nozzle area. In such engines, it is desired to provide thrust vectoring capabilities as well as conventional thrust reversing capabilities without the complexities involved in mounting the equipment within the center plug or even within the engine envelope because of the other aerodynamic features required.

The main object of the present invention is to provide a thrust deflecting mechanism usable with high by-pass ratio turbofans which provides the powerplant with VTO capability without rotation and thrust reversing for conventional operation.

Another object is to provide a deflecting mechanism which is disposed externally of the powerplant envelope so as not to compromise any aerodynamic features of the powerplant.

2

A further object is to provide a thrust deflecting mechanism which is inoperable in cruise position to avoid any performance loss in the powerplant.

Another object is to provide a deflecting mechanism which may be installed in the wing of an aircraft or in the powerplant supporting pylon and which uses highly efficient cascades for deflecting the flow to control the thrust from the powerplant.

Further, an object is to provide thrust deflecting mechanism in such an installation wherein the cascade employs movable louvers for the dual function of transition as well as blocking when thrust reversal is required.

A further object is to provide such a thrust deflecting mechanism which, by the addition of ordinary flaps acting in conjunction with the aircraft wing and the cascade provides extremely efficient thrust reversal mechanism for normal operation.

Briefly stated, I provide thrust deflecting mechanism for use in a high by-pass ratio turbofan aircraft powerplant which may have a center plug for nozzle area variation and which deflecting mechanism comprises a pylon supported from a wing of the aircraft and carrying the turbofan powerplant. A recess may be provided in either the wing or the pylon and a frame is in the recess externally of the powerplant envelope and downstream thereof. Movable and parallel louvers are disposed in the frame to form a cascade which is then pylon or wing-supported. Means are provided to move the cascade from the member which supports it at the end of the fan exhaust, substantially 45° to the vertical and to the flow path through the powerplant so that the louvers are horizontally and transversely oriented across the flow to intercept the flow downstream of the powerplant and control deflection of the flow and thus the thrust by vectoring the flow. The flow may be vectored downwardly for vertical lift. In conventional operation where reverse thrust is desired the flow may be blocked and deflected upwardly. Separate flap means carried by the wing member rearward of the leading edge are movable into abutting and V-shaped relationship with the cascade to then turn the blocked flow and reverse the thrust. Additional modifications are shown wherein plural powerplants are used and plural cascades are employed.

While the specification concludes with claims particularly pointing out and distinctly claiming the subject matter which is regarded as the invention, it is believed the invention will be better understood from the following description taken in connection with the accompanying drawings in which:

FIG. 1 is a plot illustrating a comparison between turbojets and lift cruise fan engines;

FIG. 2 is a partial cross-sectional view of a plural cruise fan powerplant installation illustrating diagrammatically one means of moving the cascade and flaps;

FIG. 3 is a partial front view of the powerplant arrangement of FIG. 2;

FIG. 4 is a top view of the powerplant of FIG. 3 showing the cascade only when they are in deflecting position;

FIG. 5 is a view similar to FIG. 3 showing a single powerplant installation and diagrammatically showing the cascade in deflecting position;

FIG. 6 is a side view of FIG. 5 schematically showing the flap mechanism for thrust reversal; and FIG. 7 is a partial view of the individual movable louver positions within the cascades.

For convenience and illustration, the invention will be described herein as it might be applied to an installation employing tip turbine cruise fans. It should be appreciated that this is one form of high by-pass ratio turbofan and that the invention is not limited to such a turbofan but is applicable to any well known turbofan including those in which the gas generator is mounted concentrically with the fan. The term "high by-pass ratio" is intended to encompass those turbofan powerplants wherein the ratio of the fan flow to the gas generator flow is 4 to 1 and above. These types of turbofans with thrust deflecting mechanism may commonly be called lift cruise fan powerplants.

Referring first to FIG. 1, there is shown a plot of the lift cruise fan powerplant characteristics versus comparable characteristics of a turbojet engine. In this plot of net thrust versus Mach number, it will be seen that the lift cruise fan has an extremely high static thrust characteristic being 260% or higher than that of the turbojet as shown by lines 10 and 11 respectively. Furthermore, it will be seen from line 10 that the lift cruise fan has a very favorable thrust lapse rate up to about Mach 0.8. This plot does not include external size or drag effects. From this curve, it will be apparent that the fan provides very high thrust propulsion power at low speeds and therefore offers excellent characteristics for vertical takeoff as well as excellent characteristics for short takeoff since its net thrust is much higher than the turbojet and, if its flow is efficiently deflected, may provide an aircraft with excellent V/STOL characteristics.

A typical turbofan powerplant of the cruise fan type is conveniently shown as a tip turbine installation in FIG. 2. In such an installation, a wing support member 12 that is attached to an aircraft, not shown, carries pylon support member 13 generally extending downwardly and forwardly from the wing 12 as shown. In order to propel the aircraft, dual high by-pass ratio cruise fans, generally indicated at 14, may be provided on either side of the pylon and faired into the pylon by nacelle structure 15 for adequate aerodynamic characteristics. The cruise fans 14 typically may be tip turbine fans 16 that are operable from gas generators 17 carried in the pylon between the cruise fans. Such an installation and the general advantages thereof are pointed out in applicant's co-pending application, Serial No. 372,781, filed June 5, 1964, now Patent 3,229,933, and assigned to the assignee of the instant application.

As described, cruise fans 14 provide very high thrust at low Mach numbers and are adequate for conventional takeoff and V/STOL operation. Such a turbofan requires the use of a variable nozzle which may be obtained by use of a movable center plug 18 to vary nozzle 19 or well-known variable flaps may be used to vary the cross-sectional area of nozzle 19.

In order to take advantage of the high net thrust availability of such a powerplant for short takeoff or even vertical takeoff it is necessary to deflect the flow through the powerplant and control the thrust therefrom by controlling this deflection. Because of the complexities of storing deflecting mechanism in the center plug application as shown as well as the desire not to compromise the aerodynamic features of the variable area nozzle in either the center plug or the variable flap type of nozzle, it is preferred that thrust deflecting mechanism be provided externally of the entire powerplant envelope so that it may be moved into position when its use is required and moved out of position during cruise operation. One such deflecting mechanism of the symmetrical FIG. 2 arrangement will be described. To this end, there is provided a frame member 20 externally of the powerplant 14 and downstream of the plug 18. In order to obtain deflection of the flow through the powerplant, the frame is provided with parallel louvers 22 to form with the frame a generally well-known cascade structure. This cascade is adapted to be interposed into the fan exhaust as later described. Since it is desired, during cruise operation, to have the cascade out of the way, the cascade may be conveniently stored within a recess 24 within pylon 13 as shown in FIG. 2. It will be noted that frame member 20 may nest smoothly within the recess 24 in pylon 13 when out of operation and may be covered by means not shown or the individual parallel louvers 22 may be closed to provide a substantially flush surface in pylon 13.

In order to move the cascade into operating position, actuation means 26 may be provided to rotate the frame 24 about pivots 28 to move the cascade into the fan exhaust at substantially 45° to the vertical as shown and at the same angle to the flow path so that the louvers 22 are horizontally and transversely oriented across the flow to intercept the flow downstream of the plug. Movement of louvers 22 controls the deflection of the thrust from the powerplant downwardly for vertical lift. The specific actuation means, as such, forms no part of the instant invention and a pivoting arrangement is shown for convenience. Other arrangements involving tracks or four-bar linkages or any suitable linkage mechanism to move the cascade into the described position may be employed.

Vertical thrust is obtained by movement of louvers 22, as shown in FIG. 7, by suitable linkage 30 to the solid line position shown. After the aircraft has risen under short takeoff or vertical takeoff, linkage 30 may actuate the louvers 22 into the dotted position shown at 31 to provide transition to the horizontal flight mode. In order to completely eliminate any performance loss by reason of the cascades remaining in the flow, once the louvers have assumed the dotted line position 31 of FIG. 7 and the aircraft is traveling horizontally, the cascade may then be pivoted out of the exhaust stream. It should be appreciated that by the louver orientation as shown, the line of direction of the thrust is not changed during the pivoting. The deflected thrust position just described for the dual installation is illustrated in FIG. 4 with wing 12 cut away to provide the top view of the cascades 20.

In order to use the same powerplants with a heavier payload, it may be desirable, depending on the facilities that exist, to use a conventional long runway for takeoff or employ short takeoff as opposed to vertical takeoff. In these forward applications, it is desired to provide reverse thrust on landing. To provide this function and use the same structure already present for vertical takeoff, the individual louvers 22 are further actuated into a closed position as shown in broken lines in FIG. 7 wherein the cascades, now closed, block the flow and, in the FIG. 2 modification, deflect it upwardly. FIG. 7 is merely illustrative of individually movable louvers which can deflect, pass the flow through, or completely block the flow. Pivoting louvers as shown are convenient but their operation is not limited to a pivoted construction. It is merely necessary that they be movable to perform their functions.

For reverse thrust, additional flap means 32 are required and are provided externally of the powerplant and are conveniently carried by the wing member 12 rearwardly of the leading edge 34. As shown in FIG. 2, flap means 32 may be thin and conveniently pivoted at the forward end thereof and actuated by suitable mechanism 36 whose specific details form no part of the instant invention. Those flaps are actuated to move into an abutting and angular V-shaped relationship with the cascade with the V opening in the forward direction as shown in FIG. 2. The combination of the flap means 32 with its pivot back from the wing leading edge forms a lip portion 38 to turn the blocked flow and reverse the thrust efficiently forwardly. For stowage of flap means 32 recess 40 may be provided in the wing in which the flap may nest during cruise operation.

In the modification of FIG. 2, the pylon member 13 carries plural cruise fan powerplants 14 on each side of the pylon as best seen in FIGS. 3 and 4 and the individual cascades of frames 20 and louvers 22 are nested on each side of the pylon in their recesses. Each cascade is movable into intercepting position downstream of its respective fan powerplant as described above. Similarly, the flap means 32 are then provided on each side of the pylon to move into abutting relation with their respective cascade and turn the blocked flow for thrust reversal as the flow is turned by the flap 32 and lip portion 38 of the wing member.

Some installations may employ a single turbofan supported by a pylon from a wing member and, in such installations, the pylon may not be convenient for storage of the cascades. A typical wing mounted installation of this type is shown in FIG. 5 wherein primed like numerals refer to like parts and it will be seen that cruise fan 14 is supported centrally by pylon 13.

Referring to FIG. 6, it may be convenient then to consider the support structure for the entire powerplant to be the wing support member 12′ acting through pylon 13′. Because of the unavailability of sufficient space in pylon support member 13′, the cascade frame 20′ may be stored in a recess 42 on the underside of the wing member and, by suitable mechanism not specifically forming part of the instant invention, may be moved into the flow intercepting position as shown in FIG. 6. A typical general type mechanism that may suffice for this purpose might include linkage 43 carrying the cascade structure and pivoted at 44 on the wing to move into flow intercepting position. Thus, the thrust deflection is again controlled downwardly for vertical thrust as explained in connection with FIG. 2. In order to obtain reverse thrust in this modification for conventional flight application, flap means 32′ may be carried downstream of the wing leading edge, as described in connection with FIG. 2, and may be dropped into the abutting and angular V-shaped relationship with the cascade as shown in FIG. 6 to turn the blocked flow forwardly for thrust reversal. Again, both the cascades of frame members 20′ with the included louvers may be swung into the wing and flaps 32′ previously swung thereunder to provide a clean aerodynamic wing structure for conventional cruise flight.

It will be appreciated that similar wing supported cascade structure might be applied to the FIG. 2 modification although, where sufficient space in pylon member 13 is available as in FIG. 2, the cascades are more easily stowed and operated from the pylon 13.

It will be apparent that the thrust deflecting mechanism herein disclosed is useful where it is impossible to store it within the engine envelope such as may occur with center plugs or variable nozzle mechanism. Further, the deflecting mechanism may be faired to clear the center plug when one is used and to fit aerodynamically into the supporting structure to provide clean lines in cruise operation. The deflecting mechanism permits taking advantage of the high static thrust characteristic of the turbofan for VTO or STO operation while, at the same time, with the mere addition of flaps 32, provides efficient thrust reversal for conventional operation.

While there have been described preferred forms of the invention, obvious modifications and variations are possible in light of the above teachings. It is therefore to be understood that within the scope of the appended claims, the invention may be practiced otherwise than as specifically described.

I claim:

1. For use in a high by-pass ratio turbofan powerplant, thrust deflecting mechanism comprising,
   a support structure for said entire powerplant,
   a frame member carried in said support structure external of said powerplant,
   movable louvers in said frame forming a cascade, and
   means to move said cascade from said support structure transverse to the fan exhaust downstream of said powerplant at substantially 45° to the vertical and the flow path to intercept the flow through said powerplant and control the deflection of the thrust.

2. Apparatus as described in claim 1 having means actuating said movable louvers to closed position to block said flow, and
   additional flap means external of said powerplant and movable into abutting and angular relationship with said cascade to turn said blocked flow and reverse the thrust.

3. Apparatus as described in claim 2 wherein said support structure has recess means therein and said cascade and flap means are nested therein.

4. Apparatus as described in claim 1 wherein said support structure is a pylon supported from an aircraft wing and said cascade is carried in said pylon.

5. Apparatus as described in claim 1 wherein said support structure is an aircraft wing and said cascade is carried in said wing.

6. Apparatus as described in claim 4 wherein said support structure carries cruise fan powerplants on either side thereof and individual cascades are nested on each side of said pylon, each cascade being movable into intercepting position downstream of its respective fan powerplant.

7. For use in a high by-pass ratio turbofan aircraft powerplant having a center plug therein, thrust deflecting mechanism comprising,
   a pylon member supported from a wing member and carrying said powerplant,
   a recess in one of said members,
   a frame carried in said recess external of said powerplant and downstream of said plug,
   movable parallel louvers in said frame forming a cascade,
   means to move said cascade from said member into the fan exhaust at substantially 45° to the vertical and to the flow path so said louvers are horizontally and transversely oriented across the flow to intercept the flow through said powerplant downstream of said plug and control deflection of the thrust downwardly for vertical lift.

8. Apparatus as described in claim 7 having means actuating said movable louvers to closed position to block said flow and deflect it upwardly, and
   additional flap means external of said powerplant and carried by said wing member rearward of the leading edge thereof and movable into abutting and angular V-shaped relationship with said cascade with the V opening forwardly to turn said blocked flow and reverse the thrust.

9. Apparatus as described in claim 7 wherein said pylon member has the recess therein and said cascade is carried in said pylon member.

10. Apparatus as described in claim 7 wherein said wing member has the recess therein and said cascade is carried in said wing member.

11. Apparatus as described in claim 7 wherein said pylon member carries cruise fan powerplants on either side thereof and individual cascades are nested on each side of said pylon, each cascade being movable into intercepting position downstream of its respective fan powerplant.

12. Apparatus as described in claim 8 wherein said pylon member carries cruise fan powerplants on either side thereof and individual cascades are nested on each side of said pylon, each cascade being movable into intercepting position downstream of its respective fan powerplant, and
   said individual additional flap means are provided on each side of said pylon to move into said abutting relation with a respective cascade to turn said blocked flow and reverse the thrust from each powerplant.

(References on following page)

References Cited by the Examiner

UNITED STATES PATENTS

| | | | |
|---|---|---|---|
| 2,932,164 | 4/1960 | Watson | 60—35.54 |
| 3,016,700 | 1/1962 | Howald | 60—35.6 |
| 3,174,709 | 3/1965 | Alderson | 244—23 |

References Cited by the Applicant

UNITED STATES PATENTS

| | | |
|---|---|---|
| 2,681,548 | 6/1954 | Kappus. |
| 2,866,610 | 12/1958 | Taylor. |
| 2,929,580 | 3/1960 | Ciolkosz. |
| 2,947,501 | 8/1960 | Flint. |
| 3,040,524 | 7/1961 | Kurti. |
| 3,028,121 | 4/1962 | Klapproth. |
| 3,035,792 | 5/1962 | Klapproth. |
| 3,087,303 | 4/1963 | Heinze. |

FERGUS S. MIDDLETON, *Primary Examiner.*

MILTON BUCHLER, *Examiner.*

L. C. HALL, A. E. CORRIGAN, *Assistant Examiners.*